(12) United States Patent
Kim

(10) Patent No.: US 7,092,247 B2
(45) Date of Patent: Aug. 15, 2006

(54) METHOD OF DESIGNING A SIZE-ADJUSTABLE MULTI-MODE DISPLAY UNIT FOR PORTABLE ELECTRONIC DEVICES

(76) Inventor: Semmie Kim, 538 Bittersweet Ter., Bridgewater, NJ (US) 08807

( * ) Notice: Subject to any disclaimer, the term of this patent is extended or adjusted under 35 U.S.C. 154(b) by 0 days.

(21) Appl. No.: 10/892,995

(22) Filed: Jul. 16, 2004

(65) Prior Publication Data

US 2006/0012951 A1   Jan. 19, 2006

(51) Int. Cl.
*G06F 1/16* (2006.01)
*H05K 7/16* (2006.01)

(52) U.S. Cl. ............... 361/681; 455/575.3; 455/575.4

(58) Field of Classification Search ............... 361/681; 248/917; 348/904, 840, 588; 455/575.1, 455/575.3, 575.4, 347, 358
See application file for complete search history.

(56) References Cited

U.S. PATENT DOCUMENTS

| | | | | |
|---|---|---|---|---|
| 5,828,410 A | * | 10/1998 | Drapeau | 348/383 |
| 6,222,507 B1 | * | 4/2001 | Gouko | 345/1.1 |
| 6,297,945 B1 | * | 10/2001 | Yamamoto | 361/681 |
| 6,643,124 B1 | * | 11/2003 | Wilk | 361/681 |
| 6,844,865 B1 | * | 1/2005 | Stasko | 345/1.3 |
| 6,931,265 B1 | * | 8/2005 | Reyes et al. | 455/566 |
| 2005/0009556 A1 | * | 1/2005 | Hickey et al. | 455/550.1 |
| 2005/0111172 A1 | * | 5/2005 | Wang | 361/680 |

* cited by examiner

*Primary Examiner*—Lisa Lea-Edmonds
*Assistant Examiner*—Corey Broussard
(74) *Attorney, Agent, or Firm*—Walter J. Tencza, Jr.

(57) ABSTRACT

An apparatus is disclosed comprising a first housing, a first display device connected to the first housing, a second housing, and a second display device connected to the second housing. The first housing may be connected to the second housing so that the apparatus can be placed into a first state and into a second state. In the first state the first display device lies on top of the second display device, so that only the first display device can be seen. In the second state the first display device and the second display device lie adjacent to one another and the first and the second display device can be seen simultaneously.

36 Claims, 9 Drawing Sheets

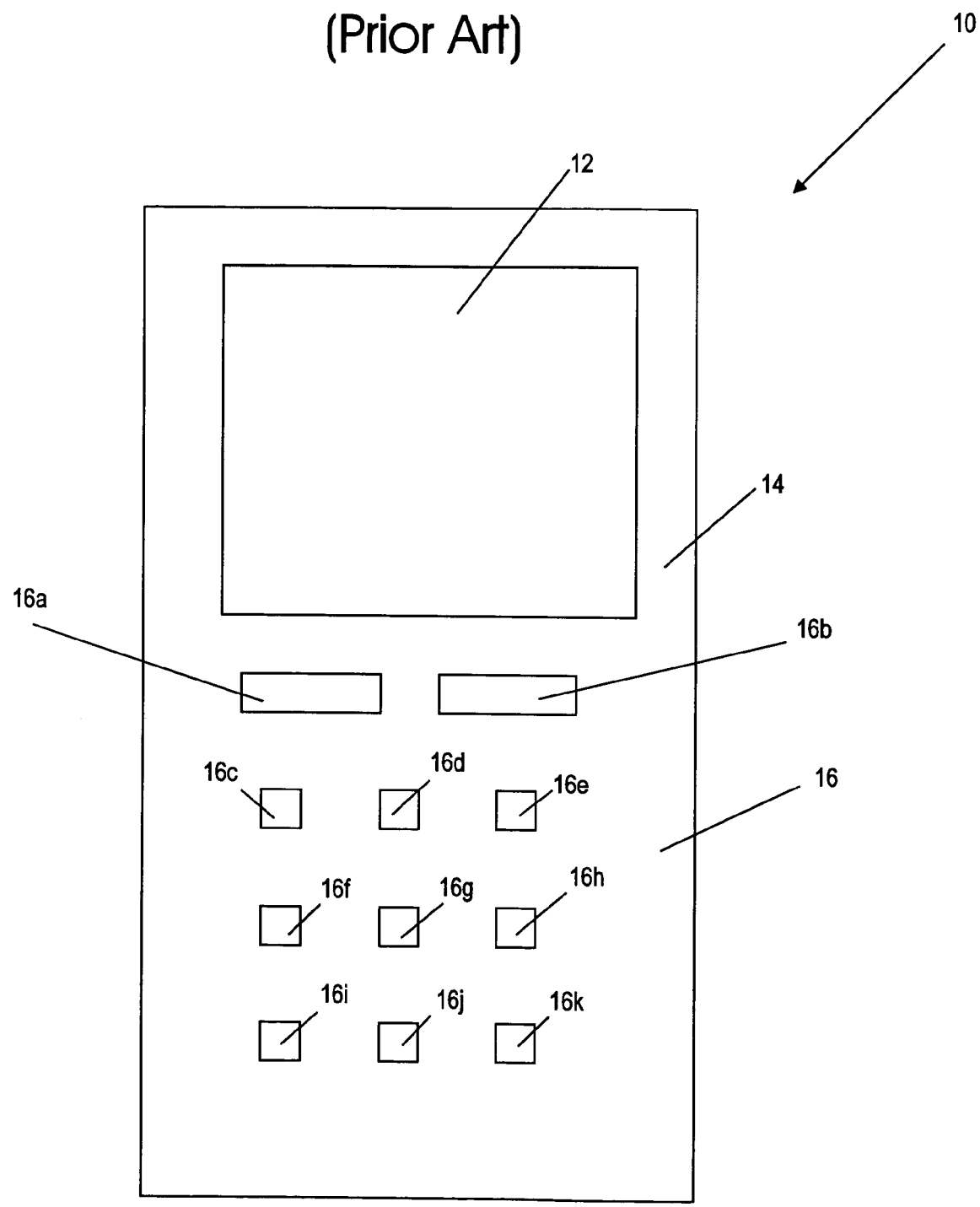

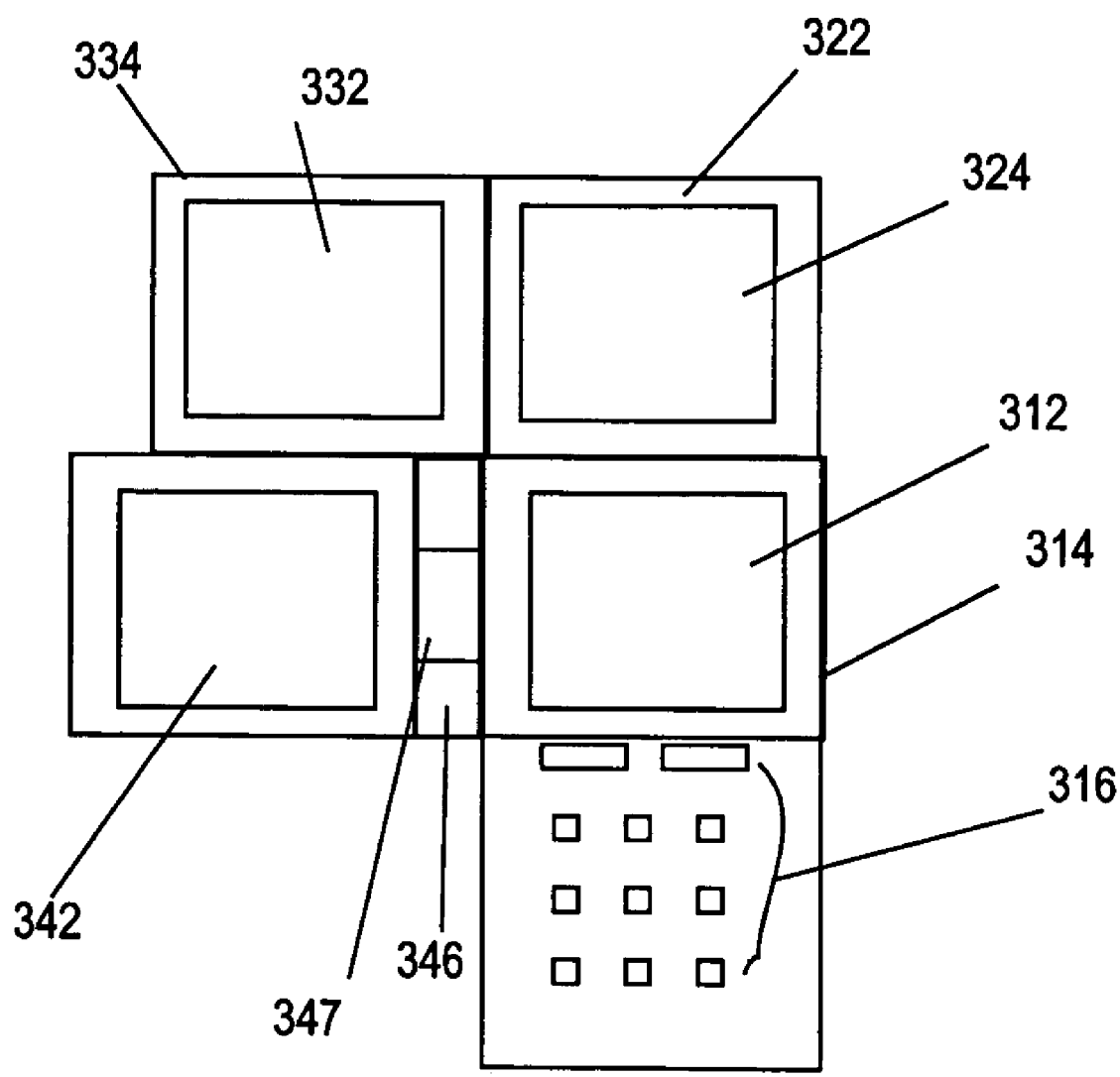

METHOD OF DESIGNING A SIZE-ADJUSTABLE MULTI-MODE DISPLAY UNIT FOR PORTABLE ELECTRONIC DEVICES

FIELD OF THE INVENTION

This invention relates to improved methods and apparatus concerning electronic displays, such as liquid crystal displays (LCDs) used by various portable electronic devices such as cell phones, personal digital assistants (PDAs), and game machines.

BACKGROUND OF THE INVENTION

All cell phones typically use a display device to provide various types of useful information (e.g., phone numbers, caller IDs, signal strength, etc.) to the user of the cell phone. First-generation cell phones mostly used character-based displays. As the technology develops, most cell phones on the market of this invention use graphics-based displays, capable of displaying not only characters but also images including moving pictures.

Because of the small size of the portable devices preferred by most users of such devices, displays in these devices are necessarily very small. On the other hand, in the case of the third-generation (and next-generation) cellular systems, services available on such systems will evolve toward data-centric services including exchange of emails, stationary and moving pictures, as well as voice communications, providing true multimedia services.

Most of the current displays are very small for such multimedia applications. For example, one of the next generation multimedia services will be the broadcast TV service available on a cell phone. The current displays are, in general, too small for such services because people usually prefer to enjoy TV pictures on a bigger display.

A quick remedy of this problem of a too-small display of a cell phone for multimedia applications would be to simply use a bigger display. In this way, though, the size of the display could increase only up to the size of the phone.

SUMMARY OF THE INVENTION

The present invention, in one or more embodiments, provides an apparatus comprising a first housing, a first display device connected to the first housing, a second housing, and a second display device connected to the second housing. The first housing may be connected to the second housing so that the apparatus can be placed into a first state and into a second state.

In the first state the first display device lies on top of the second display device, so that only the first display device can be seen. In the second state the first display device and the second display device lie adjacent to one another and the first and the second display device can be seen simultaneously.

The first housing may be connected to the second housing by a hinge or by a pin. The first housing may be connected to the second housing so that the second housing can rotate with respect to the first housing in more than one dimension. Alternatively, the first housing may be connected to the second housing by a pair of grooves. In this case, the first housing may be connected to the second housing so that the second housing can move with respect to the first housing in a direction parallel with the grooves.

The apparatus may further include a processor. The processor can communicate with the first and second display devices to cause a single image to be displayed on the first display device or on a combination of the first and second display devices. The processor can also cause a different set of information to be displayed on the first and second display devices, respectively. Different display mode can be interactively selected using a key or push button.

The apparatus may further include a third housing, a third display device connected to the third housing, a fourth housing, and a fourth display device connected to the fourth housing. The third housing and the fourth housing may be connected to the first housing, either directly or indirectly. In the first state the first display device lies on top of the second, third, and fourth display devices, so that only the first display device can be seen. The apparatus can be placed into a third state in which the first display device, the second display device, the third display device, and the fourth display device lie adjacent to one another and the first, the second, the third, and the fourth display devices can be seen simultaneously. A processor can cause a single image to be displayed on the first display device or on a combination of the first, second, third, and fourth display devices. The processor can also cause a different set of information to be displayed on the first, second, third, and fourth display devices, respectively. Different display mode can be interactively selected using a key or push button.

A method is also disclosed comprising connecting a first display device to a first housing, connecting a second display device to a second housing, and connecting the first housing to the second housing in a manner which allows the first and the second housing to be placed into the first state or the second state.

BRIEF DESCRIPTION OF THE DRAWINGS

FIG. 1 shows a top view of a prior art apparatus;

FIG. 4E shows a top view of the apparatus of FIG. 4A with the apparatus of FIG. 4A shown in a fifth state.

DETAILED DESCRIPTION OF THE DRAWINGS

FIG. 1 shows a top view of a prior art apparatus 10. The apparatus 10 includes a screen or display device 12 which may be a liquid crystal display. The apparatus 10 also includes a housing 14 and keys or push buttons 16a, 16b, 16c, 16d, 16e, 16f, 16g, 16h, 16i, 16j, and 16k. The apparatus 10 may be a known portable electronic device such as a cell phone, or other type of devices including by way of an example but not limited to PDAs (Personal Digital Assistants), notebook PCs (Personal Computers), game machines, and digital cameras. A processor may be located inside of the housing 14 and may be electrically connected to the display device 12. The processor may cause various data to be displayed on the screen or display device 12.

Figure 2A:
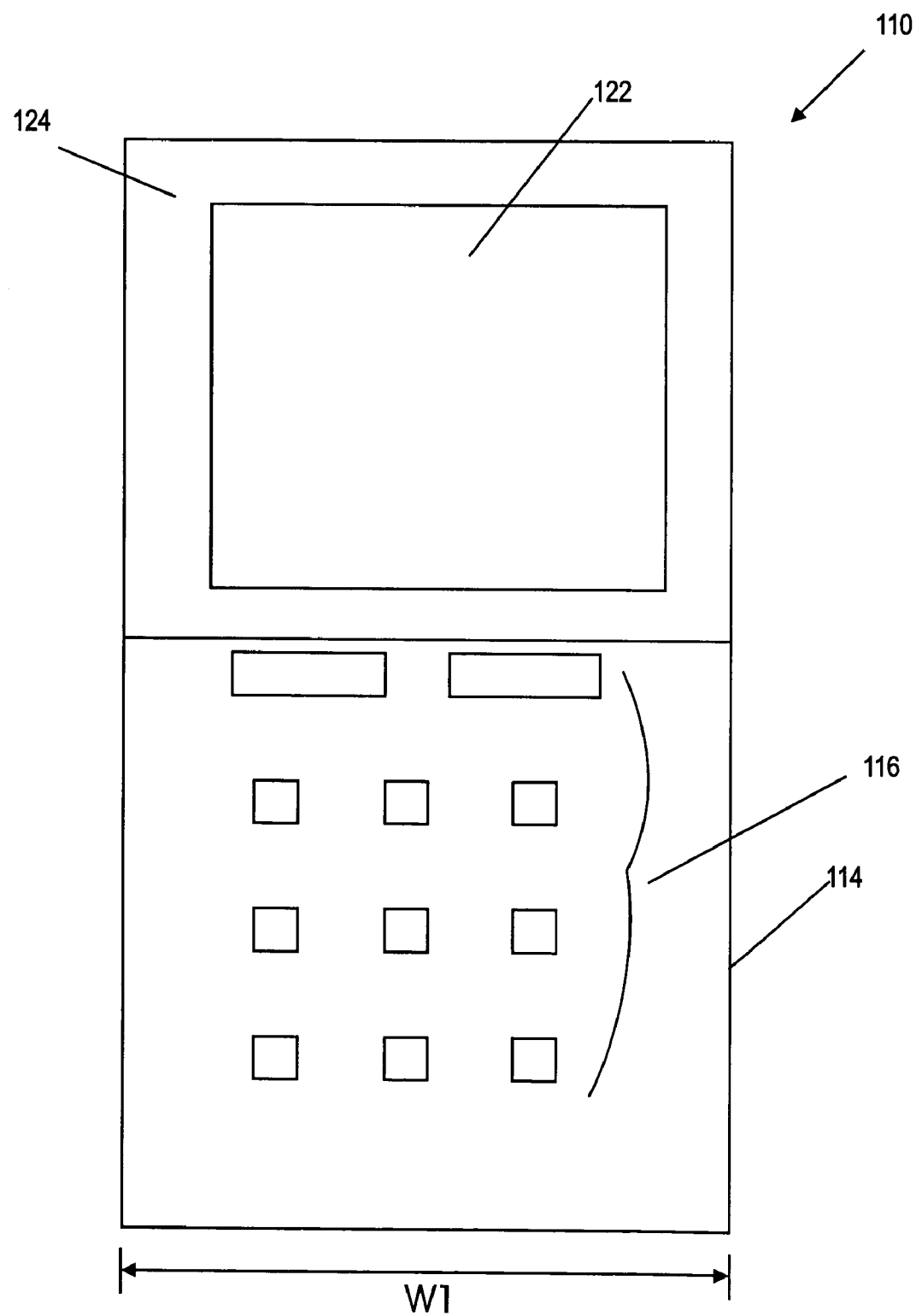
FIG. 2A shows a top view of an apparatus in accordance with a first embodiment of the present invention, with the apparatus of FIG. 2A shown in a first state.
Figure 2B:
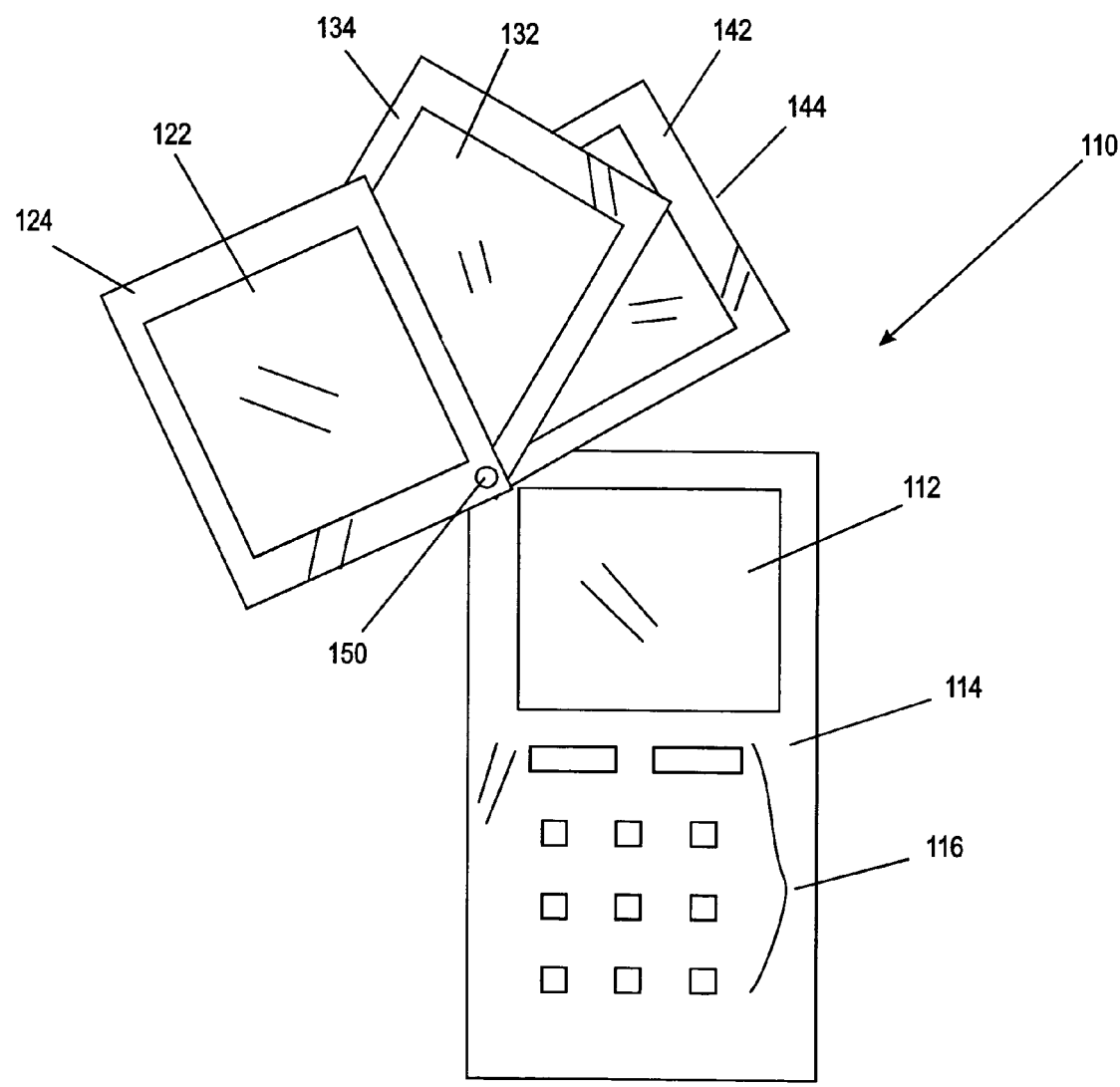
FIG. 2B shows a top view of the apparatus of FIG. 2A, with the apparatus of FIG. 2A shown in a second state.
Figure 2C:
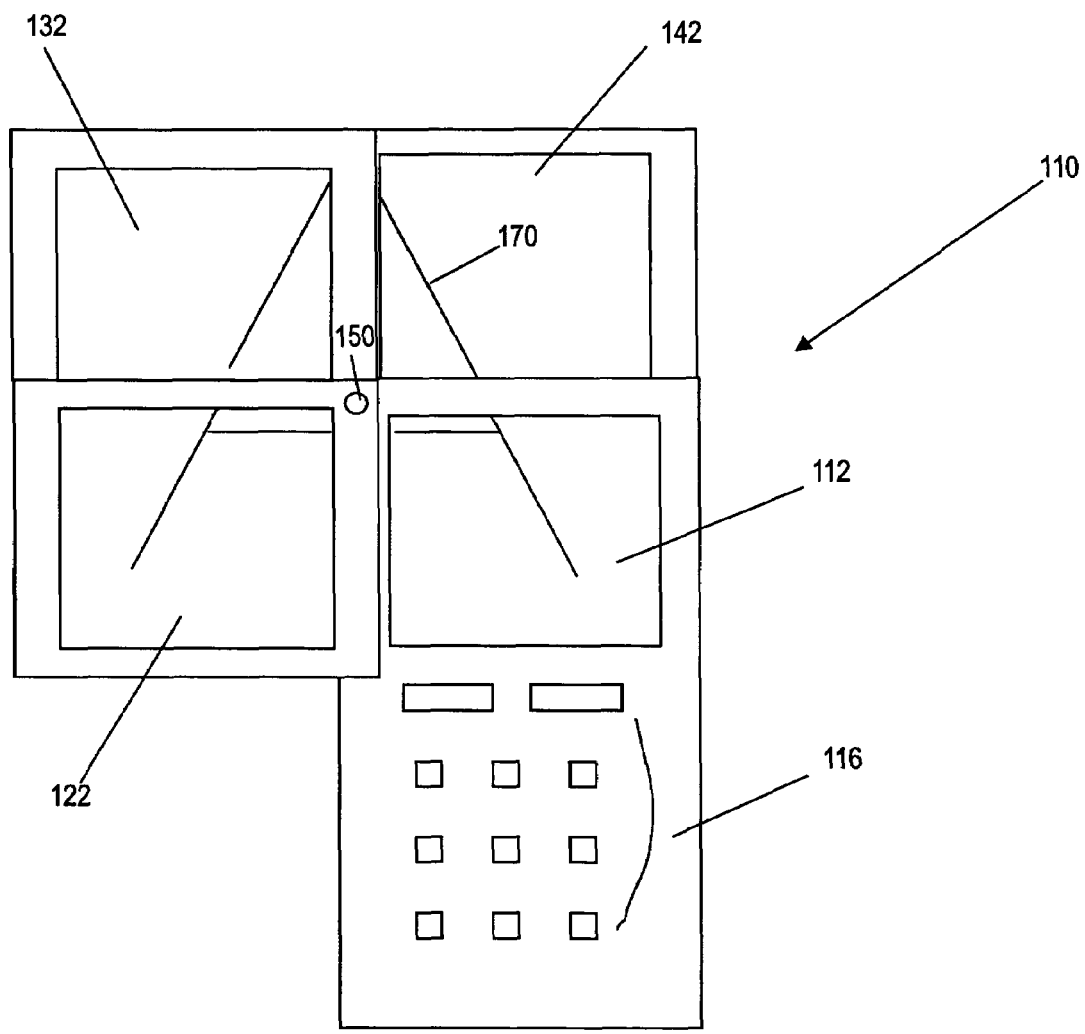
FIG. 2C shows a top view of the apparatus of FIG. 2A, with the apparatus of FIG. 2A shown in a third state.
Figure 2D:
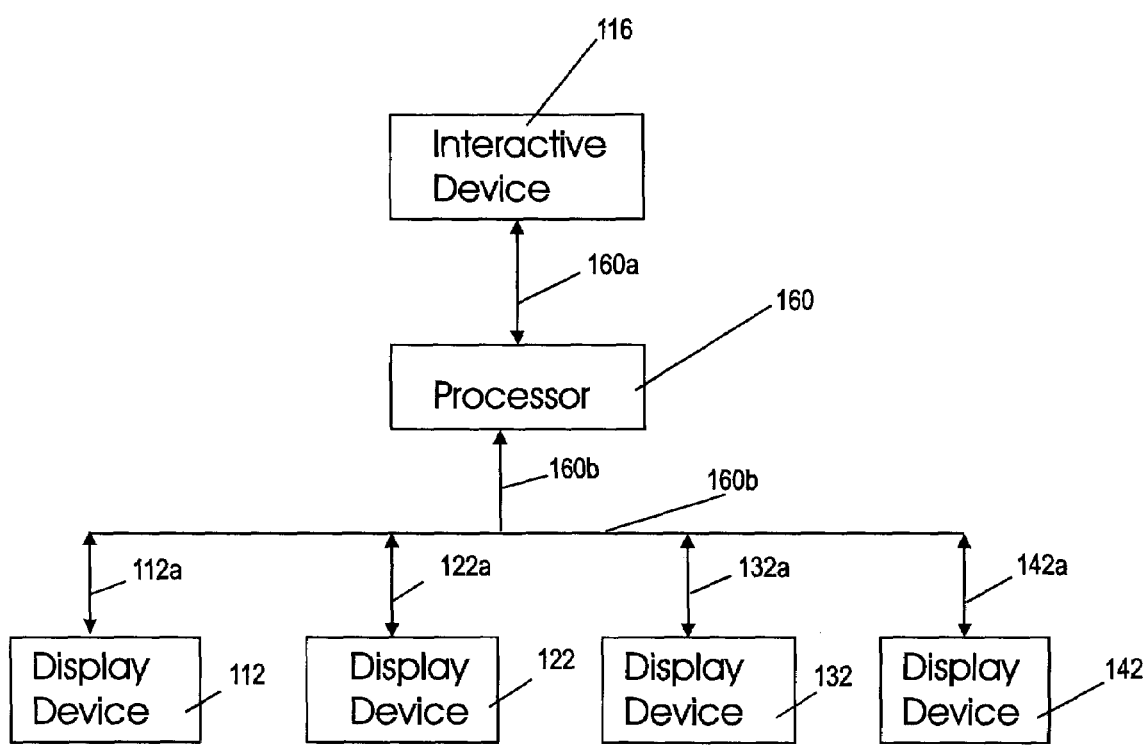
FIG. 2D shows a block diagram of some components of the apparatus of FIG. 2A.

FIG. 2A shows a top view of an apparatus 110 in accordance with a first embodiment of the present invention, with the apparatus 110 shown in a first state. FIG. 2B shows a top view of the apparatus 110 shown in a second state. FIG. 2C shows top view of the apparatus 110 shown in a third state. FIG. 2D shows a block diagram of some of the components of the apparatus 110.

The apparatus 110 includes a screen or display device 112 (shown in FIG. 2B and FIG. 2C), a housing 114, and an interactive device 116 comprised of a plurality of keys or push buttons. The apparatus 110 also includes housings 124, 134, and 144 which include or have attached thereto screen or display devices 122, 132, and 142, respectively. The apparatus 110 also includes a pin 150 which attaches housings 124, 134, and 144 to the housing 114. The housings 124, 134 and 144 can rotate with respect to the housing 114 about the pivot point located through the pin 150. The housings 124, 134, and 144 can be located directly over the housing 114 as shown in FIG. 2A, so that only housing 124 and screen 122 are seen from a top view. Each of the housings 124, 134, and 144 may be substantially the same and each of the screen devices 112, 122, 132, and 142 may be substantially the same. The housings 124, 134, and 144 can typically be aligned so that there appears to be only one screen device, i.e. screen device 122 shown in FIG. 2A.

As shown by FIG. 2C, the housings 114, 124, 134, and 144 can be placed into a configuration such that there appears to be one large screen device, comprised of screen devices 122, 132, 142, and 112. A processor 160, shown in block diagram form in FIG. 2D, may be located inside of the housing 114 and may control the screen devices 112, 122, 132, and 142. The processor 160 may be electrically connected by communications line 160b and by communications lines 112a, 122a, 132a, and 142a, to screen devices 112, 122, 132, and 142, respectively. The processor 160 may also be electrically connected to interactive device 116 by communications line 160a.

The communications lines 160a, 160b, 112a, 122a, 132a, and 142a may be any type of communications lines such as wireless or hardwired communications lines. The communications lines 160b, 112a, 122a, 132a, and 142a may be located inside of wires which pass through pin 150 to provide communication from the processor 160 in housing 114 to the screen devices 122, 132, and 142 in or on housings 124, 134, and 144, respectively.

In one operation mode, the processor 160 may cause an image such as image 170 of a large letter "A" to be displayed on the combination of screen devices 112, 122, 132, and 142, as if the combination were one screen device. In another operation mode, the processor 160 may cause an image to be displayed on one screen device, which is typically at the top in a first state. Yet in another operation mode, the processor 160 may cause a different set of information to be displayed on the combination of screen devices. The switch among different display modes can be interactively made using a key or a push button.

Figure 3A:
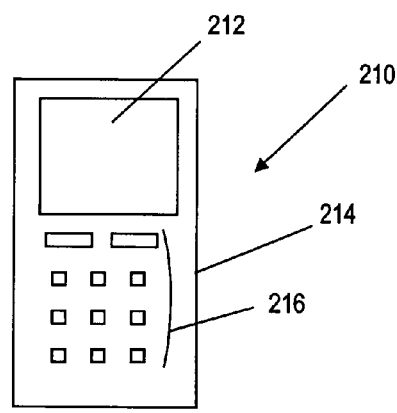
FIG. 3A shows a top view of an apparatus in accordance with a second embodiment of the present invention with the apparatus of FIG. 3A shown in a first state.
Figure 3B:
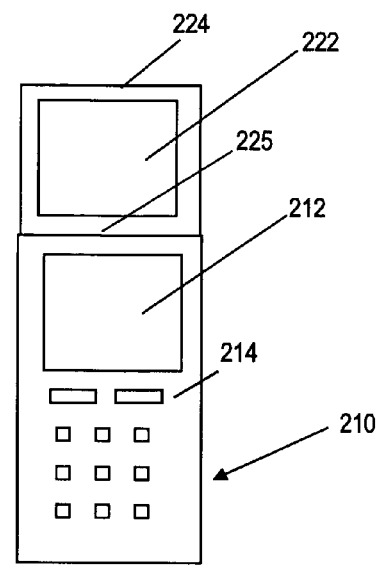
FIG. 3B shows a top view of the apparatus of FIG. 3A with the apparatus of FIG. 3A shown in a second state.
Figure 3C:
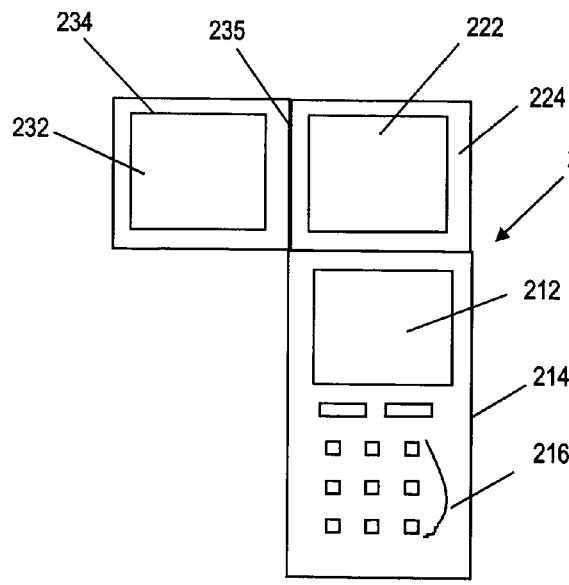
FIG. 3C shows a top view of the apparatus of FIG. 3A, with the apparatus of FIG. 3A shown in a third state.
Figure 3D:
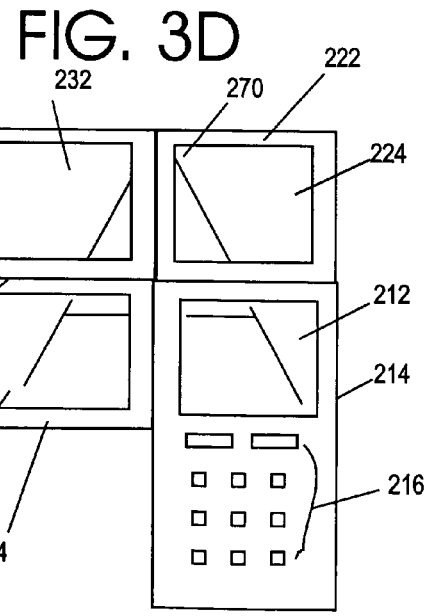
FIG. 3D shows a top view of the apparatus of FIG. 3A with the apparatus of FIG. 3A shown in a fourth state.

FIG. 3A shows a top view of an apparatus 210 in accordance with a second embodiment of the present invention, with the apparatus 210 shown in a first state. FIG. 3B shows a top view of the apparatus 210 shown in a second state. FIG. 3C shows top view of the apparatus 210 shown in a third state. FIG. 3D shows a top view of the apparatus 210 shown in a fourth state.

Referring to FIGS. 3A–3D, the apparatus 210 includes a screen or display device 212, a housing 214, and an interactive device 216 comprised of a plurality of keys or push buttons. The apparatus 210 also includes housing 224, 234, and 244 which include or have attached thereto screen or display devices 222, 232, and 242, respectively. The housing 224 is attached to the housing 214 by a hinge 225 which allows the housing 224 to fold out from being hidden under the housing 214 in FIG. 3A to the position in FIG. 3B. The housing 234 is attached to the housing 224 by a hinge 235 which allows the housing 234 to fold out from being hidden under the housing 224 in FIG. 3B to the position of FIG. 3C. The housing 244 is attached to the housing 234 by a hinge 245 which allows the housing 244 to fold out from being hidden under the housing 234 in FIG. 3C to the position of FIG. 3D.

In one operation mode, the housings 224, 234, and 244 are folded out so that the apparatus 210 is in the state of FIG. 3D. In such a state the screen devices 212, 222, 232, and 242 form a large screen. An image 270 of a large A may be displayed on the combination of screen devices 212, 222, 232, and 242. The apparatus 210 may include the components of FIG. 2D, such as a processor, for displaying images on the combination of screen devices 212, 222, 232, and 242.

Figure 4A:
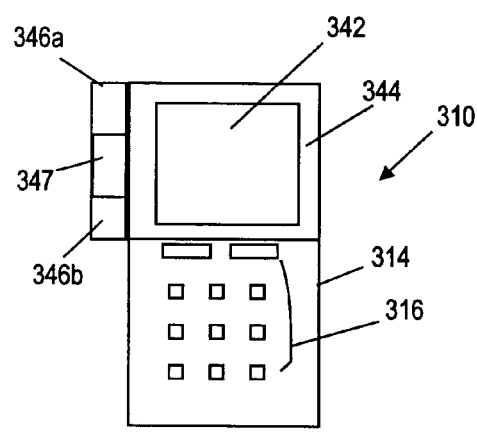
FIG. 4A shows a top view of an apparatus in accordance with a third embodiment of the present invention with the apparatus of FIG. 4A shown in a first state.
Figure 4B:
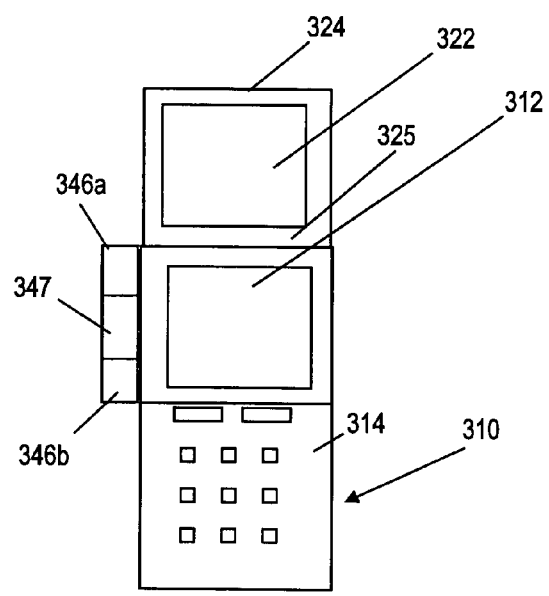
FIG. 4B shows a top view of the apparatus of FIG. 4B with the apparatus of FIG. 4A shown in a second state.
Figure 4C:
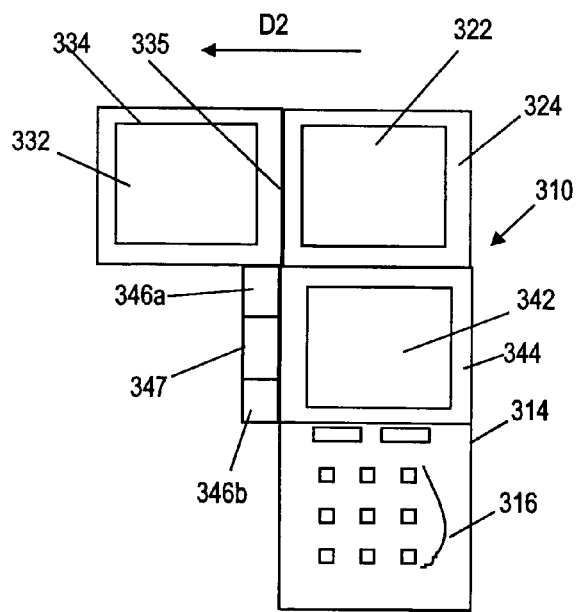
FIG. 4C shows a top view of the apparatus of FIG. 4A with the apparatus of FIG. 4A shown in a third state.
Figure 4D:
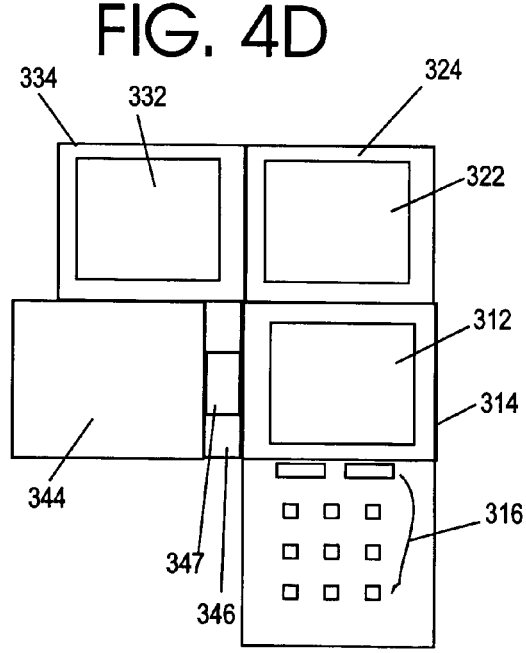
FIG. 4D shows a top view of the apparatus of FIG. 4A with the apparatus of FIG. 4A shown in a fourth state.
Figure 4F:
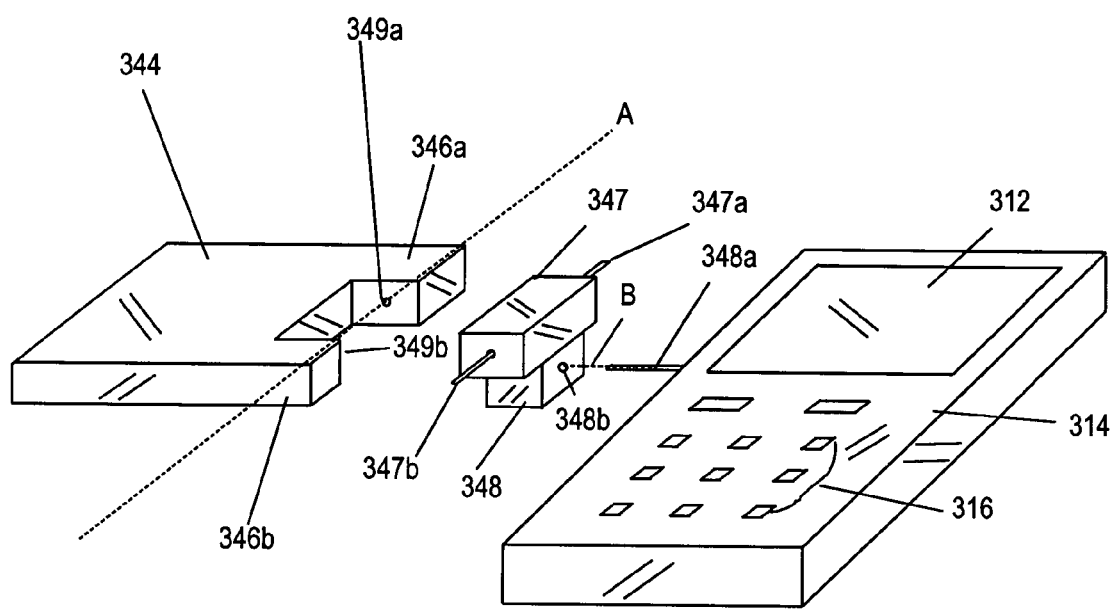
FIG. 4F shows a perspective view of part of the apparatus of FIG. 4A taken apart.

FIG. 4A shows a top view of an apparatus 310 in accordance with a third embodiment of the present invention, with the apparatus 310 shown in a first state. FIG. 4B shows a top view of the apparatus 310 shown in a second state. FIG. 4C shows top view of the apparatus 310 shown in a third state. FIG. 4D shows a top view of the apparatus 310 shown in a fourth state. FIG. 4E shows a top view of the apparatus 310 shown in a fifth state. FIG. 4F shows a perspective view of some of part of the apparatus 310.

Referring to FIGS. 4A–4E, the apparatus 310 includes a screen or display device 312 (shown in FIG. 4D), a housing 314, and an interactive device 316 comprised of a plurality of keys or push buttons. The apparatus 310 also includes housings 324, 334, and 344 which include or have attached thereto screen or display devices 322, 332, and 342, respectively. The housing 324 is attached to the housing 314 by a hinge 325 which allows the housing 324 to fold out from being hidden under the housing 314 in FIG. 4A to the position in FIG. 4B. The housing 334 is attached to the housing 324 by a hinge 335 which allows the housing 334 to fold out from being hidden under the housing 324 in FIG. 4B to the position of FIG. 4C.

The housing 344 is attached to the housing 314 by a double hinged device including a hinge 347 and a hinge 348 shown in FIG. 4F. A pin 347a is inserted into the hinge or device 347 and into a hole 349a in an extension 346a of the housing 344. A pin 347b is inserted into the hinge or device 347 and into a hole 349b of extension 346b. The pins 347a and 347b allow the housing 344 to rotate about an axis A passing through pins 347a and 347b or fold out from the position shown in FIG. 4C to the position shown in FIG. 4D. In the position of FIG. 4D, the screen device 342 can not be seen. However, the housing 344 is also connected to the housing 314 by a hinge or device 348 through a pin 348a inserted into a hole 348b in the hinge or device 348. The pin 348b allows the housing 344 to rotate about an axis B passing through the pin 348a and thus allows the housing to be turned over from the position shown in FIG. 4D to the position shown in FIG. 4E. In the position of FIG. 4E the screen device 342 can be seen simultaneously with and is in the same plane as the screen devices 312, 322, and 332. Thus the screen devices 312, 322, 332, and 342 effectively form one large screen or display device.

In another embodiment, the housing 344 may be attached to the housing 314 by a pair of grooves in parallel with the hinge 325 (one groove at the hinge 325 side, another at the side of keys 316): In this case, the housing 344 slides to the left until it stops right under the housing 334 347), where the screen devices 312, 322, 332, 342 effectively form one large display device.

In one operation mode, the housings 314, 324, 334, and 344 are placed in the state of FIG. 4E. In such a state the screen devices 312, 322, 332, and 342 form a large screen. An image or a different set of information may be displayed on the combination of screen devices 312, 322, 332, and 342. The apparatus 310 may include the components of FIG. 2D, such as a processor, for displaying images on the combination of screen devices 312, 322, 332, and 342.

The present invention, in one or more of the foregoing embodiments uses multiple display elements, screen devices or display devices connected together to increase the effective size of the display. A hybrid combination of the embodiments discussed previously may be used to adjust the effective size of the display by the use of multiple display devices.

Apparatus 110, 210, and 310 can be used in an expanded mode such that the combination of display devices are used to display an image, or could be used in a non-expanded mode so that only one screen device is used to display an image. For example apparatus 110 can be used in the expanded configuration of FIG. 2C and processor 160 can cause image 170 to be centered on the combination of display devices 132, 142, 122, and 112 as shown in FIG. 2C. Alternatively, the processor 160 can cause an image to be produced by display device 122 only in the configuration of FIG. 2A. In another embodiment, each display device can display a different set of information at the same time (multi-information mode). For example, with the apparatus 110 in the configuration of FIG. 2C, while display device 132 displays an internet web page, display device 122 can be used as a television screen, display device 112 can be used for email messages, and display device 142 can be used for phone numbers. The change from one display mode to another can be interactively made using a key or a push button, such as one of keys of interactive device 116 in FIGS. 2A–2C With current technologies for display devices, a liquid crystal display ("LCD") device would be most suitable for each of the display devices such as display devices 112, 122, 132, and 142 because such devices are thin and a digital interface with a video controller, which may be part of the processor 160, can be made easily. The digital interface available for an LCD device with a digital video controller would make it more feasible to display the expanded (blown-up) version of the same information using multiple display devices (such as devices 112, 122, 132, and 142) and/or to simultaneously display various types of information on each display device.

Another advantage of the effective larger screen made of the plurality of display devices is that bigger pictures and characters are beneficial to those having poor vision.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

The invention claimed is:

1. An apparatus comprising:
a first housing;
a first display device connected to the first housing;
a second housing;
a second display device connected to the second housing; and
wherein the second housing is connected to the first housing by a pin which allows the second housing to rotate with respect to the first housing from a first state to a second state, while the first housing remains stationary;
wherein in the first state the second housing substantially overlaps the first housing so that the first and second display devices substantially overlap and in the second state the second housing does not substantially overlap the first housing so that the first and second display devices do not substantially overlap;
wherein the second housing is substantially parallel to the first housing and remains substantially parallel to the first housing while the second housing is being rotated from the first state to the second state; and
further comprising
a third housing;
a third display device connected to the third housing; and
wherein the third housing is connected to the first housing by a pin which allows the third housing to rotate with respect to the first housing from a third state to a fourth state, while the first housing remains stationary;
wherein in the third state the third housing substantially overlaps the first housing so that the first and third display devices substantially overlap and in the fourth state the third housing does not substantially overlap the first housing so that the first and third display devices do not substantially overlap; and
wherein the third housing is substantially parallel to the first housing and remains substantially parallel to the first housing while the third housing is being rotated from the third state to the fourth state.

2. The apparatus of claim 1 further comprising
a fourth housing;
a fourth display device connected to the fourth housing; and
wherein the fourth housing is connected to the first housing by a pin which allows the fourth housing to rotate with respect to the first housing from a fifth state to a sixth state, while the first housing remains stationary;
wherein in the fifth state the fourth housing substantially overlaps the first housing so that the first and fourth display devices substantially overlap and in the sixth state the fourth housing does not substantially overlap the first housing so that the first and fourth display devices do not substantially overlap; and
wherein the fourth housing is substantially parallel to the first housing and remains substantially parallel to the first housing while the fourth housing is being rotated from the fifth state to the sixth state.

3. The apparatus of claim 2 wherein
the pin that connects the second housing to the first housing, the pin that connects the third housing to the first housing, and the pin that connects the fourth housing to the first housing are all the same pin.

4. The apparatus of claim 2 further comprising
a processor; and
wherein the processor can display a first set of information on the first display device, a second set of information on the second display device, a third set of information on the third display device, a fourth set of information on the fourth display device, and wherein the first, second, third, and fourth sets of information are substantially unrelated.

5. The apparatus of claim 4 further comprising
wherein the processor can communicate with the first, second, third, and fourth display devices to cause a single image to be displayed on a combination of the first, second, third and fourth display devices.

6. The apparatus of claim 5 further comprising
a switch which can cause the processor to either display a single image on a combination of the first, second, third, and fourth display devices, or which can cause the processor to display the first, second, third, and fourth sets of information on the first, second, third, and fourth display devices, respectively.

7. The apparatus of claim 2 further comprising
a processor; and
wherein the processor can communicate with the first, second, third, and fourth display devices to cause a single image to be displayed on a combination of the first, second, third, and fourth display devices.

8. The apparatus of claim 2 wherein
the pin that connects the second housing to the first housing, connects the second housing to the first housing at a corner of the first housing and a corner of the second housing;
the pin that connects the third housing to the first housing, connects the third housing to the first housing at a corner of the first housing and a corner of the third housing; and
the pin that connects the fourth housing to the first housing, connects the fourth housing to the first housing at a corner of the first housing and a corner of the fourth housing.

9. The apparatus of claim 8 wherein
the pin that connects the second housing to the first housing, the pin that connects the third housing to the first housing, and the pin that connects the fourth housing to the first housing are the same pin.

10. The apparatus of claim 1 wherein
the pin that connects the second housing to the first housing is the same as the pin that connects the third housing to the first housing.

11. The apparatus of claim 1 further comprising
a processor; and
wherein the processor can communicate with the first and second display devices to cause a single image to be displayed on a combination of the first and second display devices.

12. The apparatus of claim 1 further comprising
a processor; and
wherein the processor can display a first set of information on the first display device and the processor can display a second set of information on the second display device and the first and second set of information are substantially unrelated.

13. The apparatus of claim 12 further comprising
wherein the processor can communicate with the first and second display devices to cause a single image to be displayed on a combination of the first and second display devices.

14. The apparatus of claim 13 further comprising
a switch which can cause the processor to either display a single image on a combination of the first and second display devices, or which can cause the processor to display the first and second sets of information on the first and second display devices, respectively.

15. The apparatus of claim 1 wherein
the pin that connects the second housing to the first housing, connects the second housing to the first housing at a corner of the first housing and a corner of the second housing;
and the pin that connects the third housing to the first housing, connects the third housing to the first housing at a corner of the first housing and a corner of the third housing.

16. A method comprising the steps of:
connecting a first display device to a first housing;
connecting a second display device to a second housing;
connecting the first housing to the second housing;
wherein the first housing is connected to the second housing by a pin which allows the second housing to rotate with respect to the first housing from a first state to a second state, while the first housing remains stationary;
wherein in the first state the second housing substantially overlaps the first housing so that the first and second display devices substantially overlap and in the second state the second housing does not substantially overlap the first housing so that the first and second display devices do not substantially overlap; and
wherein the second housing is substantially parallel to the first housing and remains substantially parallel to the first housing while the second housing is being rotated from the first state to the second state; and further comprising
connecting a third display device to a third housing; and
connecting the third housing to the first housing; and
wherein the third housing is connected to the first housing by a pin which allows the third housing to rotate with respect to the first housing from a third state to a fourth state, while the first housing remains stationary;
wherein in the third state the third housing substantially overlaps the first housing so that the first and third display devices substantially overlap and in the fourth state the third housing does not substantially overlap the first housing so that the first and third display devices do not substantially overlap; and
wherein the third housing is substantially parallel to the first housing and remains
substantially parallel to the first housing while the third housing is being rotated from the third state to the fourth state.

17. The method of claim 16 further comprising
connecting a fourth display device to a fourth housing; and
connecting the fourth housing to the first housing; and
wherein the fourth housing is connected to the first housing by a pin which allows the fourth housing to rotate with respect to the first housing from a fifth state to a sixth state, while the first housing remains stationary;
wherein in the fifth state the fourth housing substantially overlaps the first housing so that the first and fourth display devices substantially overlap and in the sixth state the fourth housing does not substantially overlap the first housing so that the first and fourth display devices do not substantially overlap; and
wherein the fourth housing is substantially parallel to the first housing and remains substantially parallel to the first housing while the fourth housing is being rotated from the fifth state to the sixth state.

18. The method of claim 17 further comprising
the first pin that connects the second housing to the first housing, the pin that connects the third housing to the first housing, and the pin that connects the fourth housing to the first housing are the same pin.

19. The method of claim 17 further comprising
causing a single image to be displayed on a combination of the first, second, third, and fourth display devices.

20. The method of claim 17 further comprising
causing a first set of information to be displayed on the first display device, a second set of information to be displayed on the second display device, a third set of information to be displayed on the third display device, and a fourth set of information to be displayed on the fourth display device; and
wherein the first, second, third, and fourth sets of information are substantially unrelated.

21. The method of claim 20 further comprising
causing a single image to be displayed on a combination of the first, second, third, and fourth display devices.

22. The method of claim 21 further comprising
switching between a first mode in which the single image is displayed on the combination of the first, second, third, and fourth display devices and a second mode in which the first, second, third, and fourth and sets of information are displayed on the first, second, third, and fourth display devices, respectively.

23. The method of claim 22 further comprising
using a key to switch between the first and the second mode.

24. The method of claim 17 wherein
the pin that connects the second housing to the first housing connects the second housing to the first housing at a corner of the first housing and a corner of the second housing;
the pin that connects the third housing to the first housing connects the third housing to the first housing at a corner of the first housing and a corner of the third housing; and
the pin that connects the fourth housing to the first housing connects the fourth housing to the first housing at a corner of the first housing and a corner of the fourth housing.

25. The method of claim 24 wherein
the pin that connects the second housing to the first housing, the pin that connects the third housing to the first housing, and the pin that connects the fourth housing to the first housing are the same pin.

26. The method of claim 16 wherein
the pin that connects the second housing to the first housing and the pin that connects the third housing to the first housing are the same pin.

27. The method of claim 16 further comprising
causing a single image to be displayed on a combination of the first and second display devices.

28. The method of claim 16 further comprising
causing a first set of information to be displayed on the first display device and a second set of information to be displayed on the second display device, wherein the first and second sets of information are substantially unrelated.

29. The method of claim 28 further comprising
causing a single image to be displayed on a combination of the first and second display devices.

30. The method of claim 29 further comprising
switching between a first mode in which the single image is displayed on the combination of the first and second display devices and a second mode in which the first and second sets of information are displayed on the first and second display devices, respectively.

31. The method of claim 30 further comprising
using a key to switch between the first and the second mode.

32. The method of claim 16 wherein
the pin that connects the second housing to the first housing connects the second housing to the first housing at a corner of the first housing and a corner of the second housing;
and the second pin that connects the third housing to the first housing connects the third housing to the first housing at a corner of the first housing and a corner of the third housing.

33. An apparatus comprising:
a first housing;
a first display device connected to the first housing;
a second housing;
a second display device connected to the second housing;
a third housing; and
a third display device connected to the third housing;
wherein the second housing is connected to the first housing by a first hinge so that the second housing can be folded out from a first state to a second state or folded in from the second state to the first state, while the first housing remains stationary;
wherein in the first state the second housing substantially overlaps the first housing so that only one of the first and second display devices can be seen and in the second state the second housing does not substantially overlap the first housing so that both of the first and second display devices can be seen;
wherein the third housing is connected to the second housing by a second hinge so that the third housing can be folded out from a third state to a fourth state or folded in from the fourth state to the third state, while the second housing remains stationary; and
wherein in the third state the third housing substantially overlaps the second housing so that only one of the second and third display devices can be seen and in the fourth state the third housing does not substantially overlap the second housing so that both of the second and third display devices can be seen.

34. The apparatus of claim 33 further comprising:
a fourth housing; and
a fourth display device connected to the fourth housing
wherein the fourth housing is connected to the third housing by a third hinge so that the fourth housing can be folded out from a fifth state to a sixth state or folded in from the sixth state to the fifth state, while the third housing remains stationary; and
wherein in the fifth state the fourth housing substantially overlaps the third housing so that only one of the third and fourth display devices can be seen and in the sixth state the fourth housing does not substantially overlap the third housing so that both of the third and fourth display devices can be seen.

35. An apparatus comprising:
a first housing;
a first display device connected to the first housing;
a second housing;

a second display device connected to the second housing; and wherein the second housing connected to the first housing by a pin which allows the second housing to rotate from a first state to a second state, while the first housing remains stationary;

wherein in the first state the second housing substantially overlaps the first housing so that the first and second display devices substantially overlap and in the second state the second housing does not substantially overlap the first housing so that the first and second display devices do not substantially overlap;

wherein the second housing is substantially parallel to the first housing and remains substantially parallel to the first housing while the second housing is being rotated from the first state to the second state; and wherein the pin that connects the second housing to the first housing, connects the second housing to the first housing at a corner of the first housing and a corner of the second housing.

36. A method comprising the steps of;

connecting a first display device to a first housing;

connecting a second display device to a second housing;

connecting the first housing to the second housing;

wherein the first housing is connected to the second housing by a first pin so that the second housing can rotate about the first pin from a first state to a second state, while the first housing remains stationary;

wherein in the first state the second housing substantially overlaps the first housing so that the first and second display devices substantially overlap and in the second state the second housing does not substantially overlap the first housing so that the first and second display devices do not substantially overlap; and wherein the second housing is substantially parallel to the first housing and remains substantially parallel to the first housing while the second housing is being rotated from the first state to the second state;

wherein the first pin connects the first housing to the second housing at a corner of the first housing and a corner of the second housing.

\* \* \* \* \*